US011822019B2

United States Patent
Raina et al.

(10) Patent No.: US 11,822,019 B2
(45) Date of Patent: *Nov. 21, 2023

(54) METHODS, SYSTEMS, AND APPARATUS FOR DYNAMICALLY ADJUSTING RADIATED SIGNALS

(71) Applicant: QUALCOMM Incorporated, San Diego, CA (US)

(72) Inventors: Manav Raina, San Diego, CA (US); Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

This patent is subject to a terminal disclaimer.

(21) Appl. No.: 16/736,510

(22) Filed: Jan. 7, 2020

(65) Prior Publication Data
US 2020/0142043 A1 May 7, 2020

Related U.S. Application Data

(63) Continuation of application No. 15/253,516, filed on Aug. 31, 2016, now Pat. No. 10,557,928.

(51) Int. Cl.
*G01S 7/4911* (2020.01)
*G01S 7/489* (2006.01)
(Continued)

(52) U.S. Cl.
CPC ........... *G01S 7/4911* (2013.01); *B60W 30/16* (2013.01); *G01S 7/489* (2013.01); *G01S 17/04* (2020.01);
(Continued)

(58) Field of Classification Search
CPC ...... G01S 7/4911; G01S 17/931; G01S 17/04; G01S 7/489; B60W 30/16; B60W 2420/62
See application file for complete search history.

(56) References Cited

U.S. PATENT DOCUMENTS 7,382,441 B2 6/2008 Kawai et al.
8,446,571 B2 5/2013 Fiess et al.
(Continued)

FOREIGN PATENT DOCUMENTS

| JP | H07174851 A | 7/1995 | |
| WO | WO-2006007943 A1 * | 1/2006 | ............ B60W 30/16 |
| WO | 2016032780 A1 | 3/2016 | |

OTHER PUBLICATIONS

International Search Report and Written Opinion—PCT/US2017/044433—ISA/EPO—dated Nov. 2, 2017.

*Primary Examiner* — Luke D Ratcliffe
(74) *Attorney, Agent, or Firm* — QUALCOMM Incorporated

(57) ABSTRACT

Methods and apparatus for providing dynamically adjusted radiated signals are disclosed. In one aspect, a method of detecting one or more objects in a path of travel of a vehicle may include generating a laser with radiated power. The method may further include emitting the laser in a direction of travel of the vehicle and receiving one or more reflections of the emitted laser reflected from the one or more objects located in the direction of travel of the vehicle. The method may also further include generating a signal indicating that the one or more objects are in a path of the vehicle based on the received one or more reflections. The method may also include dynamically adjusting the radiated power of the laser based on an input corresponding to one or more of (i) a current speed of the vehicle or (ii) a current position of the vehicle.

21 Claims, 4 Drawing Sheets

(51) Int. Cl.
　　　*G01S 17/04*　　　(2020.01)
　　　*G01S 17/931*　　　(2020.01)
　　　*B60W 30/16*　　　(2020.01)

(52) U.S. Cl.
　　　CPC ........ *G01S 17/931* (2020.01); *B60W 2420/62* (2013.01)

(56) References Cited

U.S. PATENT DOCUMENTS

| | | | |
|---|---|---|---|
| 10,557,928 B2* | 2/2020 | Raina | B60W 30/16 |
| 2010/0165323 A1* | 7/2010 | Fiess | G01S 7/4817 |
| | | | 356/3 |
| 2010/0289660 A1* | 11/2010 | Bonne | B60Q 9/008 |
| | | | 340/670 |
| 2012/0191300 A1 | 7/2012 | Mayo | |
| 2014/0214271 A1 | 7/2014 | Choi et al. | |
| 2016/0031366 A1 | 2/2016 | White et al. | |
| 2016/0047895 A1 | 2/2016 | Dussan | |
| 2016/0061935 A1* | 3/2016 | McCloskey | G01S 17/08 |
| | | | 342/82 |
| 2018/0059228 A1 | 3/2018 | Raina et al. | |

* cited by examiner

METHODS, SYSTEMS, AND APPARATUS FOR DYNAMICALLY ADJUSTING RADIATED SIGNALS

CROSS-REFERENCE TO RELATED APPLICATIONS

This application is a continuation of U.S. patent application Ser. No. 15/253,516, filed on Aug. 31, 2016, entitled "Methods, Systems, and Apparatus for Dynamically Adjusting Radiated Signals," which is assigned to the assignee hereof and of which the entire contents are hereby incorporated by reference for all purposes.

TECHNICAL FIELD

The present application relates generally to object detection systems, and more particularly to techniques for providing dynamic and adaptive control of radiated signals used in adaptive vehicle speed control systems.

BACKGROUND

Various systems (e.g., automated control system(s)) may be used onboard vehicles (and/or computing devices in communication with the vehicles) to facilitate driving functions, autonomous or otherwise. For example, the autonomous driving functions may include steering controls, acceleration controls, braking controls, or other aspects of piloting vehicles. In some implementations, one or more of these (or other) driving functions may be integrated into a safety, accident avoidance, or other safety system or package. Such functions and/or systems or packages allow for automated (e.g., computerized) control of aspects of the driving functions. For example, as part of the acceleration and/or braking controls, the automated control system may be configured to control a vehicle speed of the autonomous vehicle. The automated control system may be further configured to monitor an environment of the vehicle, for example, via a condition monitoring system. Accordingly, when the automated control system is controlling braking for the vehicle, the control system may monitor the environment in front of the vehicle to identify any conditions that may result in slowing the speed or movement of the vehicle. Such monitoring of the environment in front of (and elsewhere around) the vehicle may be performed by one or more sensors. Operating the one or more sensors at a constant power may be problematic in zones having different driving speeds.

Accordingly, as the environment of the vehicle changes based on speed and/or position of the vehicle, methods, system, and apparatus of adaptively and/or dynamically controlling the power of the condition monitoring system are desired.

SUMMARY

The systems, methods and devices of this disclosure each have several innovative aspects, no single one of which is solely responsible for the desirable attributes disclosed herein.

In one aspect, a method of detecting one or more objects in a path of travel of a vehicle may include generating a laser having a radiated power. The method may further include emitting the laser in a direction of travel of the vehicle and receiving one or more reflections of the emitted laser reflected from the one or more objects located in the direction of travel of the vehicle. The method may also further include generating a signal indicating that the one or more objects are in a path of the vehicle based on the received one or more reflections. The method may also include dynamically adjusting the radiated power of the laser based on an input corresponding to one or more of (i) a current speed of the vehicle or (ii) a current position of the vehicle.

In another aspect, an apparatus for detecting one or more objects in a path of travel of a vehicle is disclosed. The apparatus comprises an optical circuit comprising a laser and a controller. The optical circuit is configured to generate a laser having a radiated power and emit the laser in a direction of travel of the vehicle. The optical circuit is also configured to receive one or more reflections of the emitted laser reflected from the one or more objects in the direction of travel of the vehicle. The optical circuit is further configured to generate a signal indicating the one or more objects are in a path of the vehicle based on the received one or more reflections. The controller is configured to dynamically adjust the radiated power of the laser based on an input corresponding to one or more of (i) a current speed of the vehicle or (ii) a current position of the vehicle.

In another aspect, another apparatus for detecting one or more objects in a path of travel of a vehicle is disclosed. The apparatus comprises means for generating a laser having a radiated power and means for emitting the laser in a direction of travel of the vehicle. The apparatus further comprises means for receiving one or more reflections of the emitted laser reflected from the one or more objects located in the direction of travel of the vehicle. The apparatus also comprises means for generating a signal indicating that the one or more objects are in a path of the vehicle based on the received one or more reflections. The apparatus also further comprises means for dynamically adjusting the radiated power of the laser based on an input corresponding to one or more of (i) a current speed of the vehicle or (ii) a current position of the vehicle.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

DETAILED DESCRIPTION

Figure 1A:
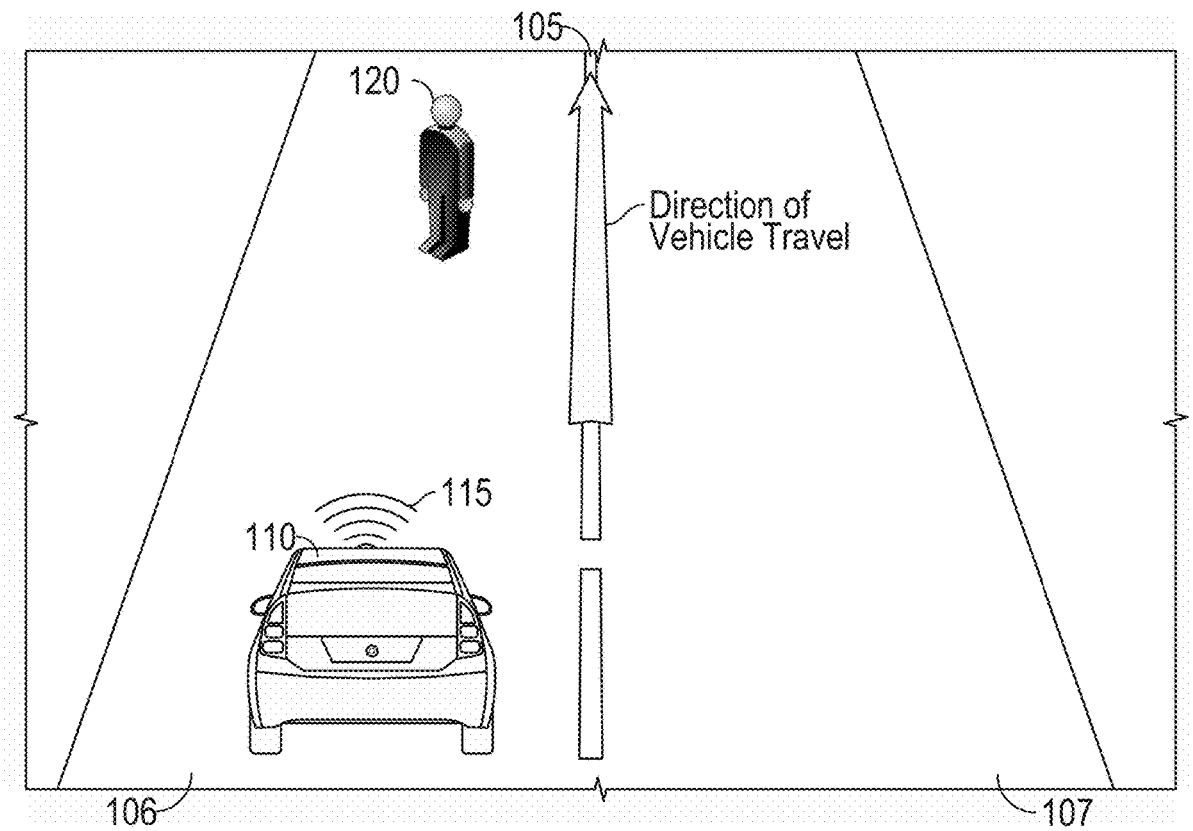
FIG. 1A is a perspective view of a vehicle traveling along a roadway in a left lane where a person is standing in the left lane in front of the vehicle in a direction of vehicle travel, in accordance with aspects of this disclosure.

Vehicles are being produced having varying levels of automated drivability options. While cruise control has existed for decades, adaptive cruise control (e.g., enabling the vehicle to automatically increase and/or decrease vehicle speed based on other vehicles around the vehicle) has only been recently developed, with accident avoidance and/or safety sensing systems being some of the most recent developments. Additionally, various manufacturers offer systems that provide automated steering controls (e.g., self-parking and/or self-driving systems). As vehicles become more intelligent with such automated systems, the vehicles may be required to process more and more data and require more and more power, the systems may be adapted to adjust their operation based on conditions in which they operate (e.g., an environment of the vehicle and/or speed of the vehicle). In some embodiments, the environment of the vehicle may include driving conditions, neighboring vehicles, a geographic region in which the vehicle is traveling, or any other environmental parameters that may impact operation of one or more systems of the vehicle. Accordingly, a system's ability to adjust its operation automatically and dynamically may be critical to reducing processing and power consumption of the vehicle and reduce interference with other vehicles and further increase safety of the vehicle operating in an automated (or semi-automated) state.

Methods, systems, and apparatus controlling the power and/or strength of signals radiated by an adaptively controlled condition monitoring system for automobiles are described herein. While automobiles are used in exemplary embodiments described herein, the methods, system, and apparatus described herein may apply to any motorized mode of transportation or any situations where environmental condition monitoring may be adaptively controlled to promote efficiency and reduce interference (from multiple reflections and with other condition monitoring systems of other vehicles). The methods, system, and apparatus described herein take advantage of input from speed information (e.g., from a speedometer) and location information (e.g., from a GPS in a navigation system of the vehicle) to perform the adaptive control of signals radiated by the vehicle's condition monitoring system.

In some embodiments, monitoring requirements of the environment by the adaptively controlled condition monitoring system may be dependent upon one or both of the speed and/or the location of the vehicle. For example, when the vehicle is traveling at highway or interstate speeds, the braking distance of the vehicle may be greater than 150 feet, and, thus, the monitoring of the environment in front of the vehicle should detect conditions (e.g., objects in front of the vehicle) at distances greater than 150 feet so the system is able to stop the vehicle before impacting the object in front of it. However, when the vehicle is traveling at speeds lower than the highway or interstate speeds described herein, the system may only need to be configured to identify conditions (e.g., the object) at much smaller distances because the vehicle may be able to stop more quickly and knowledge of conditions 150 feet away is unnecessary. Thus, the detection capabilities of the condition monitoring system may be proportional to the braking distance of the vehicle. Such adaptability of the power and/or strength of signals radiated by the control system may help minimize interference at low speeds or in populated environments where the radiated signals may generate a large number of reflections. Accordingly, the one or more sensors that monitor the environment of the vehicle may adjust their power based on the monitoring requirements to reduce power consumption and reduce processing needs at low speeds while maintaining the ability to increase power (and thus range) at higher speeds.

As described herein, in some aspects, speed information and position information of the vehicle may be used by the method, system, and/or apparatus to control the power and/or strength of the radiated signal (e.g., LASER power by a LIDAR). One example of an advantage of the proposed method, system, and apparatus may include an ability to reduce a number of reflections received from the radiated signal in a densely populated area like a downtown street which may be more populated than an empty freeway. On the downtown street, the speed of the vehicle is likely lower than on the freeway, and, accordingly, a braking distance of the vehicle is likely smaller than while driving at freeway speeds. Additionally, on the downtown street, objects of interest are likely much closer to the vehicle than at freeway speeds (say a few meters away on the downtown street vs. many meters away on the freeway). Thus, detecting an object that is several hundred meters away while driving on the downtown street is extremely difficult (due to an increased number of reflections) and not critical. An additional advantage may include reducing interference to other nearby condition monitoring systems of other vehicles.

In some embodiments, the vehicle may comprise the condition monitoring system. The processor and associated components may utilize information received from one or more other components to dynamically and adaptively control the power and/or strength of the radiated signals of the condition monitoring system. In some embodiments, the processor may be configured to calculate an adjustment to an existing radiated signal based on current information (e.g., speed or position) of the vehicle. For example, if the condition monitoring system is already generating and emitting the radiated signal, then the processor may determine, based on the information received from the one or more other components, an amount by which the power of the radiated signal is to be adjusted (e.g., reduced or increased) to more appropriately apply to current conditions of the vehicle. In some embodiments, the processor may be configured to make adjustments to the radiated signal dynamically. In some embodiments, the speed or frequency with which the adjustments are made to the radiated signal depends on the speed or the location of the vehicle. For example, when the vehicle is traveling at a high speed or in a location with a high speed limit (e.g., a freeway), the condition monitoring system may monitor and adjust parameters of the radiated signal on a more frequent basis than when the vehicle is traveling at slower speeds.

The following detailed description is directed to certain specific embodiments. However, the described technology can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Further, the systems and methods described herein may be implemented on a variety of different computing devices that can control or assist in the control of a vehicle.

FIG. 1A is a perspective view of a vehicle traveling along a roadway in a left lane where a person is standing in the left lane in front of the vehicle in a direction of vehicle travel, in accordance with aspects of this disclosure. As depicted, the vehicle 110 is traveling along the roadway 105. The direction of travel along the roadway 105 in the drawing is from the bottom of the page to the top of the page. FIG. 1A depicts two lanes of travel for the roadway 105, a left lane 106 and a right lane 107. The vehicle 110 is traveling in the left lane 106 and is broadcasting or emitting a signal 115 in the direction of travel of the vehicle (e.g., in front of the vehicle). Additionally, FIG. 1A depicts a person 120 standing in the lane 106 of the roadway 105 in the direction of travel of the vehicle 110. Though not shown in this figure, the vehicle 110 may also receive reflections corresponding to reflections of the signal 115 from objects in front of the vehicle 110 (e.g., reflections of the signal 115 from the person 120).

The signal 115 may be used by one or more systems (e.g., an adaptive speed control or accident prevention system) of the vehicle to detect and/or otherwise identify the person 120 to which the one or more systems must respond. For example, when the system is one of the adaptive speed control or the accident prevention systems, the signal 115 may be used to detect the person 120 (or any other object) in the path of the vehicle 110 that the vehicle 110 must slow down to avoid. In some embodiments, the system may identify or detect the object in the path of the vehicle 110 based on the reflection of the signal 115 from any objects in the path of the vehicle. In some embodiments, the system may be configured to receive a signal directly from the object in the path of the vehicle 110. For example, the system may receive an optical, radio frequency (RF), or other acoustic signal from the object. In some embodiments, the system may receive a data signal providing geographic or other location data either dependent on or independent from geographic or location data of the vehicle 110. The received signal may be used to indicate a location or position of the object 120 in the path of the vehicle 110.

In some embodiments, the vehicle 110 may comprise one or more sensors (not shown) that are configured to generate and emit the signal 115 in a direction away from the vehicle 110 and in front of the vehicle 110. The one or more sensors may be further configured to receive the refection of the generated signal from any object (e.g., the person 120 of FIG. 1A) in front of the vehicle 110. The one or more sensors may be further configured to determine a distance of the person 120 from the vehicle 110. In some aspects, the sensor may be configured to determine the distance of the person 120 from the vehicle 110 based on a time of flight of the signal 115 and its reflection from the person 120. In some aspect, the sensor may be configured to determine the distance of the person 120 from the vehicle 110 based on the phase or intensity of reflection of the generated signal. In some aspects, other methods may be used to determine a distance between the person 120 and the vehicle 110. In some aspects, the sensor may be coupled to a processor or controller (not shown) that is configured to determine the distance of the person 120 from the vehicle 110. In some aspects, the determined distance from the vehicle 110 to the person 120 may be displayed for a user of the vehicle 110 (not shown in this figure).

In some aspects, the one or more sensors may comprise one or more components configured to generate and emit the signal 115 and the receipt of the reflection of the signal 115 off the person 120 may be performed by one or more receipt components.

In some aspects, the one or more sensors may emit the signals 115 in one or more directions other than the direction of travel of the vehicle 110. For example, in some aspects, the one or more sensors may be configured to emit the signal 115 to detect one or more objects approaching the roadway 105 on which the vehicle 110 is traveling in a perpendicular (or approximately perpendicular) directly. In such a use, the signal 115 may be used to detect one or more objects that may approach the roadway 105 and that may create an obstacle in front of the vehicle 110 (e.g., as part of an accident avoidance system, etc.). Such a system may be used to detect cross-traffic at intersections or similar cross-traffic situations or detect wildlife or pedestrians, etc., in high crossing areas. The sensors may be similarly used to detect cross traffic when reversing or detect traffic in neighboring lanes when attempting to switch lanes.

Figure 1B:
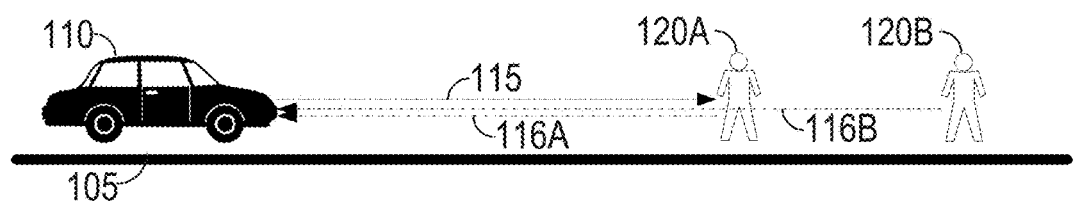
FIG. 1B is another perspective view of the vehicle traveling along the roadway where the person is standing in front of the vehicle in the direction of vehicle travel and where the vehicle is shown sending a signal or pulse that is reflected from the person, in accordance with aspects of this disclosure.

FIG. 1B is another perspective view of the vehicle 110 traveling along the roadway 105 where the person 120A and another person 120B are standing in front of the vehicle 110 in the direction of vehicle travel and where the vehicle 110 is shown sending a signal 115 or pulse that is reflected from the person 120A and the person 120B, in accordance with aspects of this disclosure. FIG. 1B shows the scene of FIG. 1A from a horizontal view point. As described herein, the vehicle 110 may include a processor or controller that uses the reflection 116A to determine the distance of the person 120A from the vehicle 110. In some aspects, the same signal 115 may continue past the person 120A and also reflect off a person 120B, causing reflection 116B of the signal 115 from the person 120B. Thus, the single signal 115 may be used to identify multiple objects in front of the vehicle 110. Similarly, a single signal or multiple signals generated and emitted in any direction may identify multiple objects in that direction in relation to the vehicle 110.

Figure 2A:
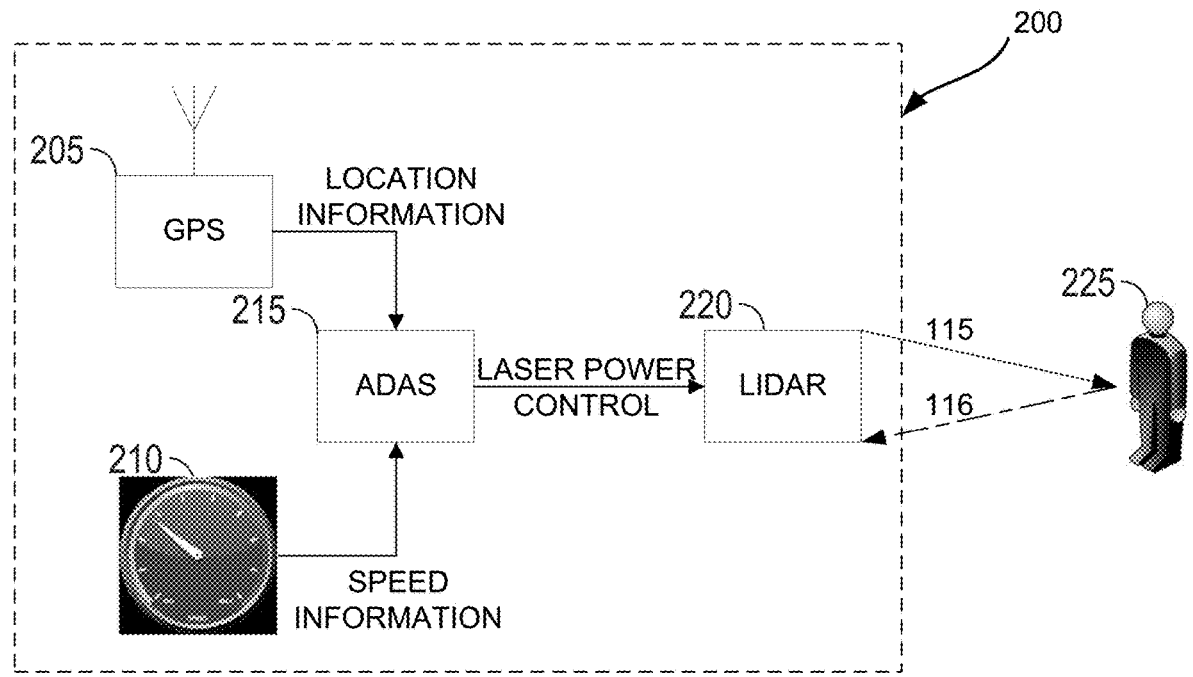
FIG. 2A illustrates an example of an adaptively controlled condition monitoring system (e.g., a computer system or vehicle control unit or system) that includes a GPS device, a speedometer, an advanced driver assistance system (ADAS), a LIDAR system, and a person, in accordance with aspects of this disclosure.

FIG. 2A illustrates an example of an adaptively controlled condition monitoring system 200 (e.g., a computer system or vehicle control unit or system) that includes a GPS device 205, a speedometer 210, an advanced driver assistance system (ADAS) 215, a LIDAR system 220, and a person 225, in accordance with aspects of this disclosure. In some embodiments, the adaptively controlled condition monitoring system 200 may be installed in the vehicle 110 (see FIGS. 1A and 1B). The adaptively controlled condition monitoring system 200 may be installed on a vehicle and configured to dynamically control the power of the LIDAR system 220 based on the speed or position of the vehicle 110.

The GPS device 205 may be configured to generate a position signal identifying a position or location of the vehicle 110. For example, the GPS device 205 may determine that the vehicle 110 is located on a residential street having a school in the vicinity. The speedometer 210 may be configured to generate a speed signal identifying a speed or velocity of the vehicle 110. For example, the speedometer 210 may determine that the vehicle 110 is traveling at less than 30 MPH. The LIDAR 220 may be configured to generate and emit radiated signals 115 (corresponding to the signal 115 of FIGS. 1A and 1B) such as lasers in one or more directions and receive reflections 116 (corresponding to the reflection 116 of FIG. 1B) of the radiated signals from objects in the paths of the signals. As will be described in further detail in relation to FIG. 2B, the GPS 205, the speedometer 210, and the LIDAR 220 may be replaced with similar components providing similar functionality in various aspects.

The ADAS 215 may receive the location information of the vehicle 110 from the GPS device 205. The ADAS 215 may further receive the speed information of the vehicle 110 from the speedometer 210. The ADAS 215 may use either one or both of the location information and the speed information to generate a laser power control signal. The laser power control signal may include commands and/or instructions to the LIDAR 220 regarding the power and/or strength at which the radiated signals of the LIDAR should be generated and emitted. The LIDAR 220 generates the radiated signal 115 that reflects from the person 225.

As described herein, the ADAS 215 may dynamically adjust the signal 115 emitted from the vehicle 110. As shown in FIG. 2A, the signal 115 may be dynamically adjusted based one or more of location information and speed information. For example, as the speed of the vehicle 110 increases (or as the position of the vehicle 110 indicates the vehicle 110 is positioned on a road with a higher speed limit), the power of the lasers of the LIDAR 220 may increase. Similarly, as the speed of the vehicle 110 decreases (or as the position of the vehicle 110 indicates the vehicle 110 is positioned on a road with a lower speed limit), the power of the lasers of the LIDAR 220 may decrease. In some aspects, the relationship between the vehicle 110 speed and the laser power may be linear. In some aspects, this relationship may be non-linear.

In some embodiments, the ADAS 215 may control the radiated laser power based on detecting a nearest object away from the vehicle 110. For example, the ADAS 215 may command the LIDAR 220 to generate the radiated laser signals starting at a low power setting. When the radiated laser signals are emitted, if no reflection is received from the emitted signals, the ADAS 215 may command the LIDAR 220 to increment the power settings and emit radiated laser signals at the higher power setting. The ADAS 215 may continue to increment the power settings until reflections are received from one or more objects. In such an embodiment, the ADAS 215 may select the "low power setting" based on the position or speed of the vehicle 110 such that the minimum braking distance of the vehicle 110 at a particular speed is always considered in the power settings.

Figure 2B:
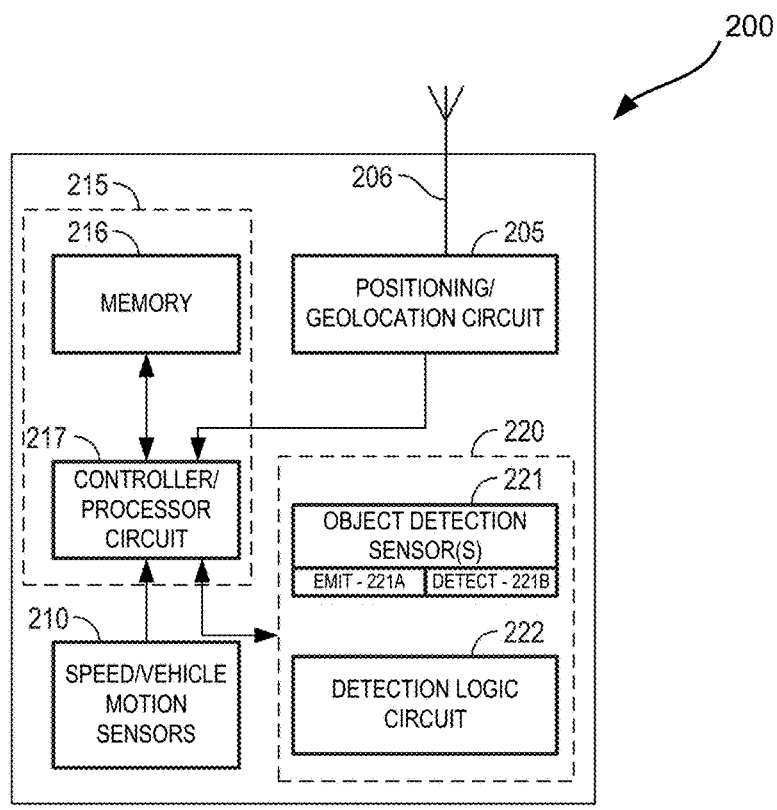
FIG. 2B illustrates a generic circuit diagram illustrating an example of components that may form the adaptively controlled condition monitoring system of FIG. 2A, in accordance with aspects of this disclosure.

FIG. 2B illustrates a generic circuit diagram illustrating an example of components that may form the adaptively controlled condition monitoring system 200 of FIG. 2A, in accordance with aspects of this disclosure. In some embodiments, the adaptively controlled condition monitoring system 200 may be installed in the vehicle 110 (see FIGS. 1A and 1B). The adaptively controlled condition monitoring system 200 includes a positioning/geolocation circuit 205 with an optional antenna 206, a speed/vehicle motion sensor 210, a memory circuit 216, a controller/processor circuit 217, an object detection sensor 221, and a detection logic circuit 222.

In some embodiments, the memory 216 and the processor 217 may form the ADAS 215. In some aspects the memory 216 and the processor 217 may merely include and/or perform functions of the ADAS 215 but not form an ADAS 215 component. In this example, the memory 216 may include instructions for instructing the processor 217 to implement the adaptively controlled detections methods in accordance with aspects of this disclosure.

Similarly, in some embodiments, the object detection sensor 221 and the detection logic circuit 222 may form the LIDAR 220 of FIG. 2A. In some aspects the object detection sensors 221 and the detection logic circuits 222 may merely include and/or perform functions of the LIDAR 220 but not form a LIDAR 220 component. In this example, the object detection sensor 221 may include hardware for generating and emitting the radiated signals (e.g., the signal 115 of FIGS. 1A-2A) and for receiving the reflected signals (e.g., the reflected signal 116 of FIGS. 1B and 2A). For example, the object detection sensor(s) 221 may comprise an emitter (EMIT) 221A. The emitter 221A may generate and emit the radiated signals, for example in a direction of travel of the vehicle comprising the monitoring system 200. The object detection sensor(s) 221 may comprise a detector (DETECT) 221B. The detector 221B may be configured to receive the reflected signals and provide them to the detection logic circuit 222. The detection logic circuit 222 may use the radiated and reflected signals to determine a distance between the LIDAR 220 and the object (e.g., the person 225) from which the reflected signals reflect. Though the object detection sensor 221 and the detection logic circuit 222 are defined herein as forming the LIDAR 220, the object detection sensor 221 and the detection logic circuit 222 may form any sensor that detects objects in a given direction (or a plurality of given directions) using any type of generated and emitted signal, including acoustic, optical, or any other signal on the electromagnetic spectrum. For example, the LIDAR 220 may be replaced with an ultrasonic sensor system 220.

The positioning circuit 205 may include an optional antenna 206 and may comprise any circuit, component, or device that generates and/or identifies a position of the vehicle 110 in which the positioning circuit 205 is installed. For example, the positioning circuit 205 may identify a geographic position or location of the vehicle 110. In some aspects, the positioning circuit 205 may comprise a global positioning system (GPS), a global navigation satellite system (GNSS), or a local positioning system and may be able to provide the geographic position of location of the vehicle 110 on a global scale or on a more localized scale. In some embodiments, the optional antenna may be configured to transmit and/or receive signals from associated components of the utilized positioning or navigation system. For example, the antenna 206 may receive signals from satellites which the positioning circuit 205 then uses to determine a position of the vehicle 110.

The vehicle motion sensor 210 may comprise any circuit, component, sensor, or device that determines or identifies one or more motion parameters of the vehicle 110 in which the vehicle motion sensor 210 is installed. For example, the vehicle motion sensor 210 may determine that the vehicle 110 is in motion and may then identify one or more of a speed and direction of the vehicle 110. In some aspects, the vehicle motion sensor 210 may comprise a speedometer, a rotations per minute (RPM) gauge of an engine of the vehicle 110, or a GPS, GNSS, or local positioning system.

The object detection sensor 221 may comprise any circuit, component, sensor, or device that generates and emits signal that can be used to detect an object in the path of the signal emission. Accordingly, the object detection sensor 221 comprises components necessary for generating and emitting the radiated signal and receiving a reflection of the radiated signal off an object in the signal's path (or other communication in response to the emitted signal). For example, in some embodiments, the object detection sensor 221 may comprise a light detection and ranging (LIDAR) system, a radio detection and ranging (RADAR) system, or any other object detection system that emits a signal and receives a reflection or response caused by the emitted signal. In some embodiments, the object detection sensor 221 may comprise a communication device that communicates with other devices to determine positions of the other devices in relation to the vehicle 110.

In some aspects, the object detection sensor 221 may comprise a power supply (not shown in this figure) for generating the radiated signal, a transmitter (not shown) for transmitting the signal, and a receiver (not shown) for receiving the reflection or the response to the signal. In some embodiments, the object detection sensor 221 may receive a command (e.g., from the processor 217) instructing the object detection sensor 221 to generate and transmit a signal for detecting the object in a particular direction, for example in front of the vehicle 110 or in a direction of travel of the vehicle 110. In some aspects, the received command may include one or more of a direction in which to transmit the signal, a type of signal to transmit if the object detection sensor 221 is configured to generate multiple types of signals (e.g., radio, optical, etc.), a quantity of signals to generate and transmit or a duration over which the signals are to be generated and transmitted, and a strength or accuracy desired of the transmitted signal(s). Based on the command, the object detection sensor 221 generates and transmits the radiated signals in one or more directions. If the signals are impeded by an object in their paths, a reflection and/or response may be created by each object in their paths, and that reflection and/or response may be received by the object detection sensor 221. In some embodiments, adjusting the power or strength of the radiated signal may comprise adjusting one or more of its intensity, luminance, frequency, beam diameter, divergence, and/or an orientation or direction in relation to the vehicle in which the signal is emitted. In some embodiments, adjusting a power of the radiated signals may comprise activating or deactivating one or more lasers. While one or more of these parameters may apply only to lasers or other optical signals, those of skill will understand that the same or similar parameters may be controlled in acoustic or RF signals to similarly control strengths or powers of radiated signals.

In some embodiments, the object detection sensor 221 may generate an output that corresponds to a parameter of the received reflection or response. For example, the output may include a duration that passed between the transmission of the generated signal and the received reflection or response, one or more parameters regarding the transmitted signal, and one or more parameters regarding the received reflection or response (e.g., a strength, etc., of the reflection). In some embodiments, the object detection sensor 221 may communicate the generated output to the detection logic circuit 222.

The detection logic circuit 222 may comprise an optional circuit, component, or device that receives the output from the object detection sensor 221 based on the transmission of the signal and the received reflection or response. In some aspects, the detection logic circuit 222 may determine a distance of the object that reflected the signal or otherwise generated a response from the vehicle 110 including the system 200. In some embodiments, the detection logic circuit 222 may use the duration of time along with associated speeds of the transmitted signal and the received reflection or response to calculate the distance of the object from the vehicle 110. In some embodiments, the detection logic circuit 222 may be integrated with the object detection sensor 221. In some embodiments, the functionality of the detection logic circuit 222 may be integrated with the processor 217.

In an illustrative embodiment of the system 200 in operation, the ADAS 215 (via the memory 216 and the processor 217) may receive information from one or both of the positioning circuit 205 and the vehicle motion sensor 210. Based on the received information, the ADAS 215 may calculate or otherwise determine the power and/or strength (or other parameters) to include in the command sent to the LIDAR 220. The LIDAR 220 then uses its object detection sensor 221 (or similar component) to generate the radiated laser signals according to the received command and emit the radiated laser signals from the object detection sensor 221. The laser signal travels away from the vehicle 110 until it reaches an object that is in its path, for example, the person 225 of FIG. 2A. The laser signal then reflects from the object. This reflection then travels back from the object to the receiving component of the object detection sensor 221. The object detection sensor 221 may generate the output signal that is communicated to the detection logic circuit 222 and/or the processor 217. When the output signal generated by the object detection sensor 221 is communicated to the detection logic circuit 222, the detection logic circuit 221 may determine the distance between the vehicle 110 and the object. In some aspects, when the output signal generated by the object detection sensor 221 is communicated directly to the processor 217, the processor 217 may determine the distance between the vehicle 110 and the object.

In some aspects, the system 200 further comprises a display (not shown). The display may be configured to display information regarding a detected object and/or information regarding the signal generated and emitted by the object detection sensor 221. In some aspects, the information regarding the detected object may include the distance from the detected object to the LIDAR 220, a size of the detected object, a velocity and/or speed of the detected object, etc. In some aspects, the information regarding the generated and emitted signal may include a strength of the signal (e.g., its intensity, luminance, frequency, beam diameter, divergence, etc.) and/or an orientation or direction in relation to the vehicle in which the signal is emitted. While one or more of these parameters may apply only to lasers or other optical signals, those of skill will understand that the same or similar parameters may be controlled in acoustic or RF signals to similarly control strengths of signals. In one aspect, the display may be configured to allow an operator of the system 200 or of the vehicle 110 in which the system 200 is in use to adjust one or more operational conditions of the system 200. In some aspects, the system 200 further comprises an input device (not shown).

The input device may take on many forms depending on the implementation. In some implementations, the input device may be integrated with the display so as to form a touch screen. In other implementations, the input device may include separate keys or buttons or near the display. These keys or buttons may provide input for navigation of a menu that is displayed on the display. In other implementations, the input device may be an input port. For example, the input device may provide for operative coupling of another device to the display and the system 200. The display or system 200 may then receive input from an attached keyboard or mouse via the input device. In still other embodiments, the input device may be remote from and communicate with the display or system 200 over a communication network, e.g., a wireless network or a hardwired network.

The memory 216 may be utilized by the processor 217 to store data dynamically created during operation of the system 200. In some instances, the memory 216 may include a separate working memory in which to store the dynamically created data. For example, instructions stored in the memory 216 may be stored in the working memory when executed by the processor 217. The working memory may also store dynamic run time data, such as stack or heap data utilized by programs executing on processor 217. The memory 216 may be utilized to store data created by the system 200. For example, data regarding objects identified in the path of the vehicle 110 may be stored in the memory 216. In some aspects, the memory 216 may be located remotely, i.e., not integral with the system 200, and may receive data via the communication network.

Furthermore, as described herein, the ADAS 215 may use data stored in the memory 216 and functions of the processor 217 to generate a signal to control the vehicle 110 based on the detected object. For example, the memory 216 may include one or more data files or structures including instructions or commands to communicate to the vehicle if the system 200 identifies an object within a specific distance of the vehicle 110. For example, in some embodiments, the processor 217 may generate a signal to a braking system of the vehicle 110 to command the vehicle 110 to stop or slow based on the determined distance between the vehicle 110 and the detected object. In some embodiments, the processor 217 may generate a signal to a safety system of the vehicle 110 that instructs the airbags be deployed and/or seatbelts and other restraints be placed in a tense mode. In some embodiments, based on one or more detected objects, the processor 217 may generated instructions or commands to the safety or other system of the vehicle 110 to close and/or lock all windows, doors, etc., such that the system 200 may provide further functionality to existing automated systems of the vehicle 110. In some embodiments, the processor 217 may generate communications from the vehicle 110 to another external system based on detected conditions.

In some embodiments, the memory 216 may include data regarding correlations between speeds of the vehicle and radiated power/strength settings of the object detection sensor 221. For example, the memory 216 may include data including appropriate parameters for the radiated signal given the vehicle speed and/or location inputs. Thus, when the processor 217 of the ADAS 215 receives an input from the speedometer that the vehicle 110 is traveling at 25 MPH, the processor 217 may access memory 216 to identify from the data what the appropriate power settings for the radiated signals of the object detection sensor 221. In some embodiments, the processor 217 may determine an amount to change the radiated signal power settings based on this data, where the memory 216 may include data regarding previous power settings and speed or position information. Thus, the processor 217 may identify a current set of parameters for the radiated signal that were based on a previously input vehicle speed or position (stored in the memory 216). By comparing the previously input vehicle speed or position, the processor 217 can determine the adjustment to the radiated signal based on a difference between the previously input vehicle speed and/or position and the current vehicle speed and/or position.

In some embodiments, the memory 216 may include one or more thresholds. For example, the memory 216 may include a maximum power (or similar) threshold configured to establish a maximum power for the radiated signal. Similarly, the memory 216 may include a minimum power threshold that establishes a minimum power threshold for the radiated signal. In some embodiments, the user of the vehicle 110 or the system 200 may be enabled to change the minimum and maximum power thresholds via an input device (described herein). In some embodiments, the memory 216 may include maximum and minimum thresholds for various vehicle speeds. For example, highway speeds (or positions) may have a higher minimum threshold than residential speeds (or positions). Similarly, residential speeds (or positions) may have a lower maximum threshold than highway speeds (or positions). These minimum and maximum thresholds may act as clamps within which the power of the radiated signals must be maintained.

Figure 4:
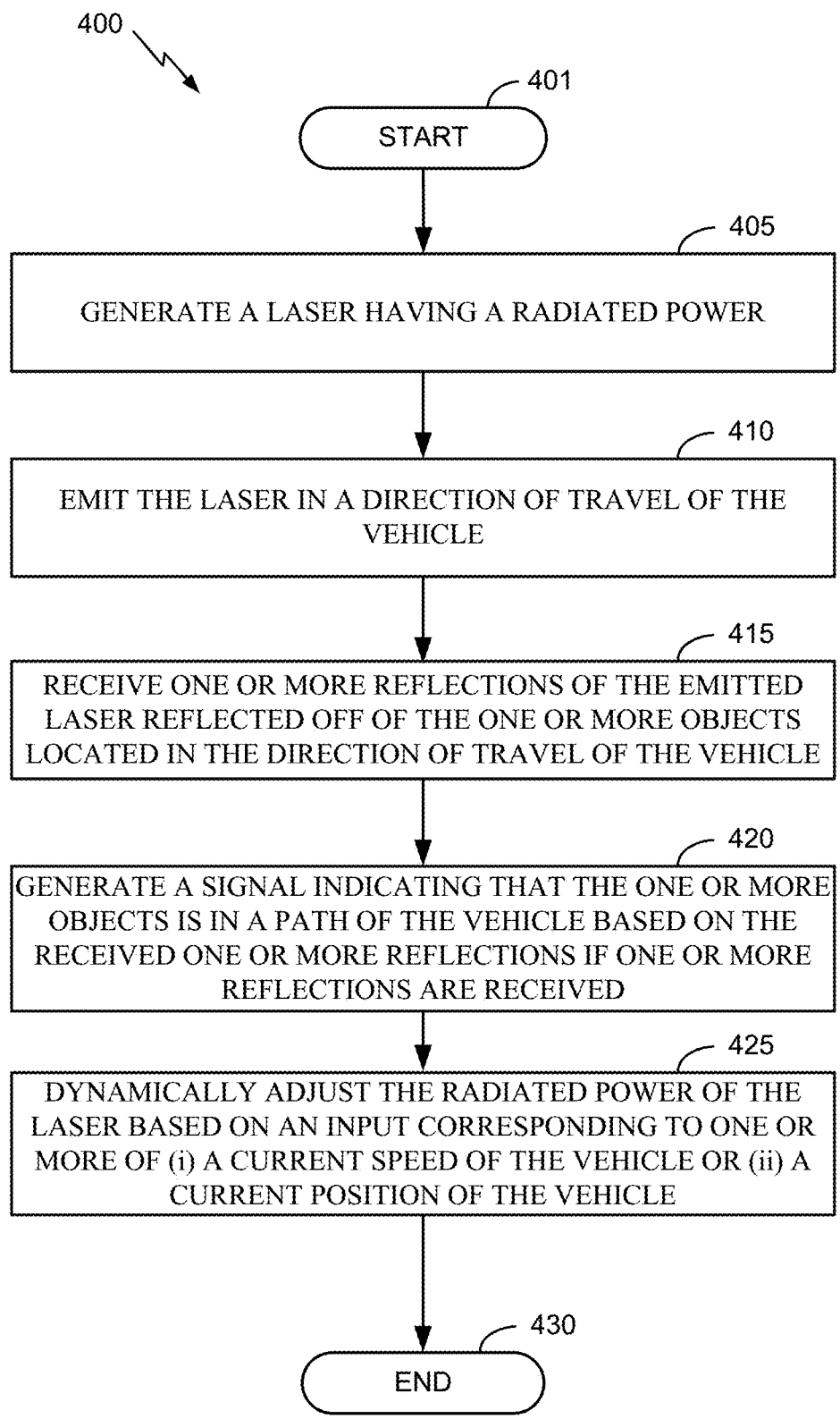
FIG. 4 is a process flowchart illustrating an example method for adaptively controlling radiated signals operable by the adaptively controlled condition monitoring device of FIGS. 1-3, in accordance with aspects of this disclosure.

As described herein, the memory 216 may be considered a computer readable medium and stores instructions for instructing the processor 217 to perform various functions in accordance with this disclosure. For example, in some aspects, the memory 216 may be configured to store instructions that cause the processor 217 to perform method 400, or portion(s) thereof, as described below and as illustrated in FIG. 4.

In one implementation, the instructions stored in the memory 216 may include instructions for performing adaptive or dynamic adjustment of the strength of the signal generated and emitted by the object detection sensor 221. In some embodiments, these instructions may comprise adjusting one or more of the intensity, luminance, or frequency of the signal when the signal is an optical (e.g., laser) signal. When the signal is another type of signal, different parameters or aspects of the signal may be adaptively or dynamically adjusted. The instructions may configure the processor 217 to receive and review the information received from the positioning circuit 205 and/or the vehicle motion sensor 210. Based on the information received from one or both of these circuits, the processor 217 may determine how to adjust the signal being generated by the object detection sensor 221. The processor 217 may then provide the command to the object detection sensor 221 including the adjusted information such that the signal generated and emitted by the object detection sensor 221 is adjusted according to the determinations of the processor 217 and based on one or both of the position circuit 205 and the vehicle motion sensor 210.

In some embodiments, the dynamic and/or adjusted information stored in the memory 216 may be further involved with the adaptive or dynamic adjustment of the strength of the generated and emitted signal. For example, the inputs received from the position circuit 205 and/or the vehicle motion sensor 210 may be used in conjunction with one or more tables or similar storage structures that provide correspondence between different positions or speeds with strength adjustments for the signal generated and emitted by the object detection sensor 221. Accordingly, for example, a speed of the vehicle 110, as received by the processor 217 from the vehicle motion sensor 210, may be used to "lookup" a strength at which the signal generated by the object detection sensor should be emitted to most efficiently and effectively identify an object in the direction in which the signal is emitted.

In some aspects, the system 200 may further include an integrated circuit (IC) that may include at least one processor or processor circuit (e.g., a central processing unit (CPU)) and/or a graphics processing unit (GPU), wherein the GPU may include one or more programmable compute units.

Figure 3:
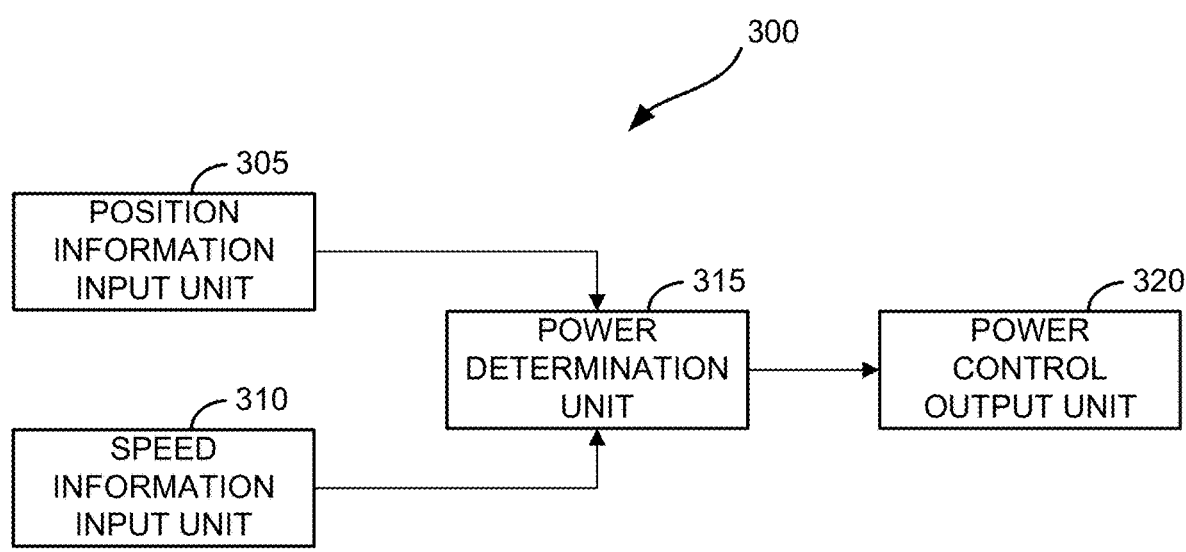
FIG. 3 is a functional block diagram of an adaptively controlled condition monitoring device that may be employed as depicted in FIGS. 1-2B, in accordance with aspects of this disclosure.

FIG. 3 is a functional block diagram of an adaptively controlled condition monitoring device 300 corresponding to the system 200 that may be employed as depicted in FIGS. 1-2B, in accordance with aspects of this disclosure. The functional block diagram of FIG. 3 includes a position information input unit 305, a speed information input unit 310, a power determination unit 315, and a power control output unit 320. The positioning information input unit 305, the speed information input unit 310, the power determination unit 315, and the power control output unit 320 may all be integrated into the single device 300. The device 300 may comprise a self-contained device that may retrofit into existing vehicles having LIDAR or other preexisting condition monitoring system. One or more of the position information input unit 305, the speed information input unit 310, the power determination unit 315, and the power control output unit 320 may share a processor, a memory, a communication interface, a power supply, or any other operational component to minimize cost and size of the device 300.

The position information input unit 305 may comprise similar components and functionality as the positioning circuit 205 of FIG. 2B. Similarly, the speed information input unit 310 may comprise similar components and functionality as the vehicle motion sensor 210 of FIG. 2B. The power determination unit 315 may comprise similar components and functionality as the ADAS 215 of FIG. 2B. The power control output unit 320 may comprise similar components and functionality as the LIDAR 220 of FIG. 2B.

Example Flowcharts for Dynamic and Adaptive Radiated Signal Power Control

FIG. 4 is a process flowchart illustrating an example method 400 for adaptively controlling radiated signals operable by the adaptively controlled condition monitoring system 200 of FIGS. 1-3, in accordance with aspects of this disclosure. For example, the method 400 could be performed by the processor 217 illustrated in FIG. 2B. In some aspects, the method 400 may be performed by the system 200 or the ADAS 215 illustrated in FIGS. 2A and 2B. A person having ordinary skill in the art will appreciate that the method 400 may be implemented by other suitable devices and systems. Although the method 400 is described herein with reference to a particular order, in various aspects, blocks herein may be performed in a different order, or omitted, and additional blocks may be added.

The method 400 begins at block 401. At block 405, the processor 217 generates a laser having a radiated power. In some embodiments, the laser may be generated by the object detection sensor 221 of FIG. 2B. At block 410, the processor 217 emits the laser in a direction of travel of the vehicle. In some embodiments, the laser is emitted by the object detection sensor 221. At block 415, the processor 217 receives one or more reflections of the emitted laser reflected from the one or more objects located in the direction of travel of the vehicle. In some embodiments, the object detection sensor 221 may receive the one or more reflections. At block 420, the processor 217 may generate a signal indicating that the one or more objects is in a path of the vehicle based on the received one or more reflections if one or more reflections are received. In some embodiments, the generated signal may be communicated to one or more other systems of the vehicle 110. At block 425, the processor 217 may dynamically adjust the radiated power of the laser based on an input corresponding to one or more of (i) a current speed of the vehicle 110 or (ii) a current position of the vehicle 110. In some embodiments, the processor may generate the command to dynamically adjust the radiated power of the laser for communication to the object detection sensor 221, which adjusts the radiated power (e.g., one or more of intensity, luminance, frequency, beam diameter, divergence, and/or an orientation or direction in relation to the vehicle in which the signal is emitted). The method ends at block 430.

An apparatus or system for adaptively controlling radiated signals may perform one or more of the functions of method 400, in accordance with certain aspects described herein. The apparatus or system may comprise a means for generating a laser. In certain aspects, the means for generating a laser can be implemented by the object detection sensor 221 (e.g., the emitter 221A) (FIG. 2B) or the LIDAR 220. In certain aspects, the means for generating a laser can be configured to perform the functions of block 405 (FIG. 4). The apparatus or system may further comprise means for emitting the laser in a direction of travel of the vehicle. In certain aspects, the means for emitting the laser can be implemented by the object detection sensor 221 (e.g., the emitter 221A) or the LIDAR 220. In certain aspects, the means for emitting the laser can be configured to perform the functions of block 410 (FIG. 4).

The apparatus or system further comprises a means for receiving one or more reflections of the emitted laser. In certain aspects, the means for receiving one or more reflections can be implemented by the object detection sensor 221 or the LIDAR 220. In certain aspects, the means for receiving one or more reflections can be configured to perform the functions of block 415. The apparatus or system may further comprise means for generating a signal indicating that the one or more objects are in a path of the vehicle. In certain aspects, the means for generating a signal can be implemented by the object detection sensor 221, the processor 217, the detection logic circuit 222, or the LIDAR 220. In certain aspects, the means for generating a signal can be configured to perform the functions of block 420 (FIG. 4).

The apparatus or system further comprises a means for dynamically adjusting the radiated power of the laser based on an input of a speed or location of the vehicle. In certain aspects, the means for dynamically adjusting the radiated power can be implemented by the object detection sensor 221, the processor 217, or the LIDAR 220. In certain aspects, the means for dynamically adjusting the radiated power can be configured to perform the functions of block 425 (FIG. 4).

Other Considerations

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

In some embodiments, the circuits, processes, and systems discussed above may be utilized in a car, truck, bus, marine craft, aircraft, or other vehicle. The vehicle may include one or more processors, one or more sensors, and a memory including instructions or modules for carrying out the processes discussed above. The device may also have one or more communication interfaces, one or more input devices, and one or more output devices such as a display device. The wireless communication interface may additionally include a transmitter and a receiver. The transmitter and receiver may be jointly referred to as a transceiver. The transceiver may be coupled to one or more antennas for transmitting and/or receiving wireless signals. The wireless communication interface may allow the vehicle to wirelessly connect to vehicle. In some embodiments, the wireless communication interface may interface with users wireless via one or more of laptop or desktop computers, cellular phones, smart phones, wireless modems, e-readers, tablet devices, gaming systems, etc. The wireless communication interface may operate in accordance with one or more industry standards such as the 3rd Generation Partnership Project (3GPP).

The functions described herein may be stored as one or more instructions on a processor-readable or computer-readable medium. The term "computer-readable medium" refers to any available medium that can be accessed by a computer or processor. By way of example, and not limitation, such a medium may include random-access memory (RAM), read-only memory (ROM), electrically erasable programmable read-only memory (EEPROM), flash memory or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method of detecting one or more objects approaching a path of travel of a vehicle, comprising:
   generating a first laser signal transmission having a first radiated power in a direction other than the path of travel;
   determining that no reflections of the first laser signal transmission off of objects in the direction other than the path of travel are received;
   generating a second laser signal transmission having a second radiated power in the direction other than the path of travel in response to determining that no reflections of the first laser signal transmissions off of objects in the direction other than the path of travel were received, wherein the second radiated power is greater than the first radiated power, and wherein the greater radiated power includes a greater beam diameter;

receiving one or more reflections of the second laser signal transmission reflected from the one or more objects located in the direction other than the path of travel of the vehicle;

generating an indication that the one or more objects are proximate to a path of the vehicle based on the received one or more reflections;

dynamically adjusting the radiated power of the second laser signal transmission based on (i) a current speed of the vehicle or (ii) a current position of the vehicle, or a combination thereof; and limiting the radiated power of the second laser signal transmission based on a maximum power threshold, wherein the maximum power threshold is adjusted based upon a speed limit associated with the current position of the vehicle.

2. The method of claim 1, further comprising receiving the current speed from one or more of a GPS device or a speedometer and wherein the current position is received from the GPS device.

3. The method of claim 1, wherein dynamically adjusting the radiated power of the laser transmission comprises dynamically adjusting the radiated power of the laser transmission based on the current speed of the vehicle, wherein the current speed of the vehicle is linearly related to the radiated power of the laser transmission such that as the current speed of the vehicle increases, the radiated power increases, and as the current speed of the vehicle decreases, the radiated power decreases.

4. The method of claim 3, further comprising determining an adjustment for the radiated power of the laser transmission based on one or more calculations using the current speed or the current position of the vehicle as a variable in the one or more calculations.

5. The method of claim 3, further comprising determining an adjustment for the radiated power of the laser transmission based on correlated radiated power and speed information stored in a memory.

6. The method of claim 1, wherein the maximum power threshold is adjusted based upon a proximity of a school to the current position of the vehicle.

7. The method of claim 1, wherein a first speed of the vehicle will result in a first radiated power of the laser transmission and a second speed of the vehicle that is greater than the first speed will result in a second radiated power of the laser transmission that is greater than the first radiated power.

8. An apparatus for detecting one or more objects approaching a path of travel of a vehicle, the apparatus comprising:

an optical circuit comprising a laser and configured to:
generate a first laser signal transmission having a radiated power in a direction other than the path of travel,
determine that no reflections of the first laser signal transmission off of objects in the direction other than the path of travel are received,
generate a second laser signal transmission having a second radiated power in the direction other than the path of travel in response to determining that no reflections of the first laser signal transmission off of objects in the direction other than the path of travel were received, wherein the second radiated power is greater than the first radiated power, and wherein the greater radiated power includes a greater beam diameter,
receive one or more reflections of the second laser signal transmission reflected from the one or more objects in the direction other than the path of travel of the vehicle, and
generate an indication that the one or more objects are proximate to a path of the vehicle based on the received one or more reflections;

a controller configured to dynamically adjust the radiated power of the second laser signal transmission based on (i) a current speed of the vehicle or (ii) a current position of the vehicle, or a combination thereof, wherein the controller is further configured to limit the radiated power of the second laser signal transmission based on a maximum power threshold, wherein the maximum power threshold is adjusted based upon a speed limit associated with the current position of the vehicle.

9. The apparatus of claim 8, wherein the current speed is received from one or more of a GPS device and a speedometer and wherein the current position is received from the GPS device.

10. The apparatus of claim 8, wherein the radiated power of the laser is dynamically adjusted based on the current speed of the vehicle, wherein the current speed of the vehicle is linearly related to the radiated power of the laser such that as the current speed of the vehicle increases, the radiated power increases, and as the current speed of the vehicle decreases, the radiated power decreases.

11. The apparatus of claim 10, wherein the controller is further configured to determine an adjustment for the radiated power of the laser based on one or more calculations using the current speed or the current position of the vehicle as a variable.

12. The apparatus of claim 10, wherein the controller is further configured to determine an adjustment for the radiated power of the laser based on correlated radiated power and speed information stored in a memory.

13. The apparatus of claim 8, wherein the controller is further configured to adjust the maximum power threshold based upon a proximity of a school to the current position of the vehicle.

14. The apparatus of claim 8, wherein a first speed of the vehicle will result in a first radiated power of the laser and a second speed of the vehicle that is greater than the first speed will result in a second radiated power of the laser that is greater than the first radiated power.

15. An apparatus for detecting one or more objects approaching a path of travel of a vehicle, the apparatus comprising:

means for generating a first laser signal transmission having a first radiated power in a direction other than the path of travel;
means for determining that no reflections of the first laser signal transmission off of objects in the direction other than the path of travel are received;
means for generating a second laser signal transmission having a second radiated power in the direction other than the path of travel in response to determining that no reflections of the first laser signal transmissions off of objects in the direction other than the path of travel are received, wherein the second radiated power is greater than the first radiated power, and wherein the greater radiated power includes a greater beam diameter;

means for receiving one or more reflections of the second laser signal transmission reflected from the one or more objects located in the direction other than the path of travel the vehicle;

means for generating an indication that the one or more objects are proximate to a path of the vehicle based on the received one or more reflections;

means for dynamically adjusting the radiated power of the second laser signal transmission based on (i) a current speed of the vehicle, or (ii) a current position of the vehicle, or a combination thereof; and means for limiting radiated power of the second laser signal transmission based on a maximum power threshold, wherein the maximum power threshold is adjusted based a speed limit associated with the current position of the vehicle.

16. The apparatus of claim 15, further comprising means for receiving the current speed from one or more of a GPS device and a speedometer and wherein the current position is received from the GPS device.

17. The apparatus of claim 15, wherein the means for dynamically adjusting the radiated power of the laser transmission comprises means for dynamically adjusting the radiated power of the laser transmission, based on the current speed of the vehicle, wherein the current speed of the vehicle is linearly related to the radiated power of the laser transmission such that as the current speed of the vehicle increases, the radiated power increases, and wherein as the current speed of the vehicle decreases, the radiated power decreases.

18. The apparatus of claim 15, wherein the maximum power threshold is adjusted based upon a proximity of a school to the current position of the vehicle.

19. The apparatus of claim 17, further comprising means for determining an adjustment for the radiated power of the laser transmission based on one or more calculations using the current speed or the current position of the vehicle as a variable in the one or more calculations.

20. The apparatus of claim 17, further comprising means for determining an adjustment for the radiated power of the laser transmission based on correlated radiated power and speed information stored in a memory.

21. The apparatus of claim 15, wherein a first speed of the vehicle will result in a first radiated power of the laser transmission and a second speed of the vehicle that is greater than the first speed will result in a second radiated power of the laser transmission that is greater than the first radiated power.

* * * * *